US010893450B2

(12) United States Patent
Liu et al.

(10) Patent No.: US 10,893,450 B2
(45) Date of Patent: Jan. 12, 2021

(54) METHOD FOR DATA TRANSMISSION DURING CROSS-CELL HANDOVER

(71) Applicant: GUANGDONG NUFRONT COMPUTER SYSTEM CHIP CO., LTD, Guangzhou (CN)

(72) Inventors: Qianlei Liu, Beijing (CN); Shenfa Liu, Beijing (CN); Desheng Yan, Beijing (CN); Dongshan Bao, Beijing (CN)

(73) Assignee: GUANGDONG NUFRONT COMPUTER SYSTEM CHIP CO., LTD., Guangzhou (CN)

(*) Notice: Subject to any disclaimer, the term of this patent is extended or adjusted under 35 U.S.C. 154(b) by 0 days.

(21) Appl. No.: 16/332,703

(22) PCT Filed: Dec. 7, 2016

(86) PCT No.: PCT/CN2016/108807
§ 371 (c)(1),
(2) Date: Mar. 12, 2019

(87) PCT Pub. No.: WO2018/090409
PCT Pub. Date: May 24, 2018

(65) Prior Publication Data
US 2019/0364471 A1 Nov. 28, 2019

(30) Foreign Application Priority Data
Nov. 16, 2016 (CN) .......................... 2016 1 1005917

(51) Int. Cl.
*H04W 36/08* (2009.01)
*H04W 36/00* (2009.01)
(52) U.S. Cl.
CPC ....... *H04W 36/08* (2013.01); *H04W 36/0016* (2013.01); *H04W 36/0061* (2013.01)

(58) Field of Classification Search
None
See application file for complete search history.

(56) References Cited

U.S. PATENT DOCUMENTS 6,490,259 B1 * 12/2002 Agrawal ................. H04L 45/00
370/331
7,383,357 B2 * 6/2008 Leichter ............ H04L 29/12009
370/392
(Continued)

FOREIGN PATENT DOCUMENTS

| CN | 101247317 A | 8/2008 |
| CN | 101938787 A | 1/2011 |
| CN | 105744575 A | 7/2016 |

OTHER PUBLICATIONS

The World Intellectual Property Organization (WIPO) International Search Report and Written Opinion for PCT/CN2016/108807 dated Jul. 28, 2017 4 Pages (including translation).

*Primary Examiner* — German Viana Di Prisco
(74) *Attorney, Agent, or Firm* — Anova Law Group, PLLC (57) ABSTRACT

Disclosed in the present invention is a method for realizing continued transmission of user data during cross-cell handover of a user station. The method comprises: constructing a continuation guide table in an AP of a wireless network cell; when cross-cell handover of a user station occurs, configuring the continuation guide table in the AP; and when handover occurs, forwarding data being transmitted by the user station according to the continuation guide table. Further disclosed in the present invention is an AP of a wireless network cell. The AP is realized by constructing a continuation guide table in an existing AP. According to the present invention, uninterrupted transmission of data streams being transmitted when a user crosses a wireless network cell can
(Continued)

be realized, thereby improving the user experience when the user surfs the internet using a wireless network.

15 Claims, 3 Drawing Sheets

(56) References Cited

U.S. PATENT DOCUMENTS

| | | |
|---|---|---|
| 7,525,940 B2 | 4/2009 | Trossen et al. |
| 2006/0274899 A1* | 12/2006 | Zhu ........................ H04L 9/083 380/281 |
| 2009/0040995 A1* | 2/2009 | Buddhikot ........ H04L 29/12358 370/338 |
| 2013/0152168 A1* | 6/2013 | Nasir .................... H04W 12/08 726/4 |
| 2016/0088615 A1* | 3/2016 | Soyak ............... H04W 72/0426 370/254 |
| 2017/0332420 A1* | 11/2017 | Cui .................... H04L 61/2015 |
| 2019/0253380 A1* | 8/2019 | Bennett ................ H04L 45/741 |

* cited by examiner

METHOD FOR DATA TRANSMISSION DURING CROSS-CELL HANDOVER

CROSS-REFERENCE TO RELATED APPLICATION

This application claims the benefit of International Application No. PCT/CN2016/108807, filed on Dec. 7, 2016, which claims the benefit of Chinese Application 201611005917.6, filed on Nov. 16, 2016. The entire contents of both applications are incorporated herein by reference.

FIELD OF THE DISCLOSURE

The disclosure relates to the field of wireless network communication, especially to the realization of user station cross-cell handover in a wireless network system.

BACKGROUND OF THE DISCLOSURE

With the continuous development of wireless communication technology and network technology, wireless networks are being increasingly utilized. In addition to cellular communication technology, a variety of wireless network technologies suitable for different scenes have been proposed and applied in the corresponding scenes, such as WiFi technology that enables fast data communication in a small coverage area, ZigBee technology that enables access to many nodes, etc, An ultra-high-speed wireless local area network technology (EUHT technology) has been proposed, which may provide higher data rates than WiFi technology, and may provide better support for a user's movement, greater coverage than the WiFi technology, support for higher mobile speeds, and higher data rates. Currently, this technology has been applied to the Internet access of high-speed rail systems and wireless broadband access in rural areas. In addition, it is expected that with the development of wireless communication technologies and network technologies, more wireless network technologies suitable for specific scenarios will emerge.

Although the above wireless network technologies may enable wireless users in a coverage area to achieve corresponding communication performance, it generally cannot support the connection of user data flow when a user cross-cell handover occurs between wireless networks. For example, when a WiFi user station leaves the current WiFi cell and enters the adjacent WiFi cell, the current WiFi standard does not support continued data transmission in the new WiFi cell of the data currently being transmitted. In fact, the transmission of the data being transmitted by the user station through the access point (AP) of the original WiFi cell and the Internet station will be interrupted. After that, if the user wants to continue the original service in the new WiFi cell, the original data connection needs to be reconnected, which may seriously affect the user experience when using the wireless network to surf the Internet using mobile signals. This is especially true in a situation in which a user crosses to a different type of wireless network cell. For example, when a user leaves an EUHT cell and enters a WiFi cell, it is more difficult to connect the currently transmitted services in the new cell.

Although different physical layer and MAC layer technologies may be adopted in the above wireless network cells, they all share the following characteristics: they are all connected to a common external network through an IP protocol (the most typical example of the external network being the Internet) to achieve Internet access.

SUMMARY OF THE DISCLOSURE

In order to solve the problems existing in the prior art, disclosed in the present invention is a method for realizing continued transmission of user data during cross-cell handover of a user station. The method comprises: constructing a continuation guide table in an AP of a wireless network cell; configuring the continuation guide table in the AP, when cross-cell handover of a user station occurs; forwarding data being transmitted by the user station according to the guidance table, when handover occurs. The continuation guide table in the AP comprises: a outbound guide table, used for searching for the network layer address of the next-hop station that is forwarded: after receiving the data packet sent to the user station by the correspondent station of the user station of the cell, the AP searches through the table for the user station in the local cell but having switched to other cells, and find the network layer address of the next hop station that forwards the packet; When the cell where the AP is located contains a user station configured with a local IP address, further comprising: the transfer reception table, used for finding the local IP address of the user station in the local cell: for the user station that is switched to access the local cell and configured with the local IP address, when the AP receives the continued forwarding packet sent by other APs, searching the transfer reception table and finding out the local IP address of the user station in the cell. The outbound guide table comprises: wireless transfer table as shown below

| user's station IP address in this cell | user's station MAC address/ virtual connection number in this cell |
|---|---|
|  |  | a outbound reference table

| virtual connection number | global IP address of target station forwarded to |
|---|---|
|  |  | or, wireless transfer table as shown below

| IP address of user station in this cell | MAC address of user station in this cell | global IP address of target station forwarded to |
|---|---|---|
| ; |  |  | a. the virtual link number in the table, is a label that AP configures for the user station that leaves cell covered by the AP.
b. the inbound reference table, specifically as follows:

| global IP address of original AP | IP address of User station in the original cell | local IP address of User station in the cell |
|---|---|---|
| . |  |  | when cross-cell handover of a user station occurs, configuring the continuation guide table in the AP, specifically: report information to a dedicated server in the external network by the user station or/and the original cell AP or/and the new cell AP, and configure the continuation guide table in the AP by the dedicated server; or, exchange information through signaling between the user station, the original cell AP, and the new cell AP to implement configuration of the continuous guidance table in the AP. by querying the configured continuation guide table, AP can find not only the address of the next hop station forwarding the forward transmission data packet, but also the address of the next hop station forwarding the backward transmission data packet; Wherein forward transmission, data transmission from the correspondent station of the user station to the user station, and reverse transmission, data transmission from the user station to its correspondent station. Forwarding data being transmitted by the user station according to the guidance table, when handover occurs, specifically: In addition to the data packet transmission between the original cell AP and the correspondent station of the user station, encapsulate the forwarded data packet by the way of IP in IP by each station, and then send the data packet to the next hop station, the original IP packet encapsulated in the IP in IP packet: a data packet sent between the original cell AP and the user station when the user station is still in the original cell.

The user station obtains the address of the next hop station forwarding the backward transmission data packet according to the data forwarded by the guidance table, comprising: After the user station's receiving the forward transmitted IP in IP packet forwarded by its previous hop station, taking the source address of the IP in IP packet as the address of the next hop station when reversing the packet transmission.

To achieve the above objective, the present invention provides an AP of a wireless network cell, specifically: A continuation guide table set therein, where the continuation guide table includes at least a outbound reference table for searching for a network layer address of the next hop station that is forwarded: the AP receives data sent by the correspondent station of the user station of the cell to the user station. after receiving the data packet sent to the user station by the correspondent station of the user station of the cell, the AP searches through the table for the user station in the local cell but having switched to other cells, and finds the network layer address of the next hop station that forwards the packet; when the cell where the AP is located contains a user station configured with a local IP address, the continuation guide table comprises a transfer reception table, used for finding the local IP address of the user station in the local cell: for the user station that is switched to access the local cell and configured with the local IP address, when the AP receives the continued forwarding packet sent by other APs, the AP searches the transfer reception table and finds out the local IP address of the user station in the cell.

A virtual link number or a wireless transfer table of the destination station address configured by the AP for the user station leaving the home cell and enter the new cell, for the user station where the handover does not occur in the cell, the AP can implement the normal wireless forwarding function through the wireless forwarding.

A terminal for a wireless network comprises: IP address resolution module, used for taking the source address of the above IP in IP packet as the address of the next hop station of the reverse transmission packet of the terminal after confirming that the original IP packet encapsulated in the received IP in IP packet is a continuous forwarding packet sent to itself.

In summary, the present invention provides a method for realizing that a data stream being transmitted by a user is connected in a new cell when switching over a cell of a wireless network. By using this method in the current wireless network cell, the user experience when the user uses the wireless network to access the Internet in the mobile state can be greatly improved.

DETAILED DESCRIPTION OF THE DISCLOSURE

The application provides a method for realizing continued transmission of user data during cross-cell handover of a user station.

In the method provided by the present disclosure, a wireless network cell includes an access point (AP) and one or more user stations. The AP may implement wireless coverage of user stations in the cell by adopting a wireless communication technology. The AP may also be connected to an external network, so that the user station in the wireless cell may access the Internet through the external network. The AP may act as a central base station and provide direct physical signal coverage for all user stations in the wireless cell. The AP may implement wireless connection for all user stations in the wireless cell through direct coverage or multi-hop transmission, for example, when the wireless cell is a wireless mesh network cell.

In a method provided by the present disclosure, there may be a plurality of wireless network cells that are connected to a common external network through their respective APs. The wireless network cells may be wireless network cells using the same type of wireless communication technology, or wireless network cells using different types of wireless communication technologies. The same type of wireless communication technology here refers to a technology that adopts the same physical layer and MAC layer wireless communication standards, and different types of wireless communication technologies refer to technologies that adopt different physical layer and/or MAC layer wireless communication standards.

A typical example of a common external network to which these wireless network cells are connected is the Internet.

In the method provided by the present disclosure, the AP of a wireless network cell may refer to a station in the wireless network that may implement wireless coverage of the user stations on the one hand, and connect to the external network on the other hand, and may communicate with the external network. This station may have different names in different wireless communication protocols.

In the method provided by the present disclosure, the station in the wireless network cell and the external network to which the wireless network cell is connected may support the IP protocol, including but not limited to the IPv4 protocol and the IPv6 protocol.

In the method provided by the present disclosure, when a user station accesses a certain wireless network cell, an IP address may be assigned to the user station by a certain station, usually an AP. The IP address configured for the user station may be divided into a global IP address and a local IP address. Generally, the AP may configure all global IP addresses or all local IP addresses for the user stations in the wireless network cell. Accordingly, wireless network cells may be divided into a type of cells configured with global IP addresses and a type of cells configured with local IP addresses. In the description of the present disclosure, the two types of cells may be referred to as global IP cells and local IP cells.

In certain cases, the AP may configure global IP addresses for some user stations and local IP addresses for other user stations in the wireless cell. In the description of the present disclosure, for convenience of description, such a cell may also be referred to as a local IP cell, and the corresponding AP is referred to as a local IP cell AP.

In the method provided by the present disclosure, for a local IP cell, the AP of the cell may support the NAT (Network Address Translation) protocol or another equivalent protocol. Through address translation of the protocol, communication between a user station having only the local IP address in the cell and a station of an external network may be realized.

In the IPv6 protocol, all stations may be configured with global IP addresses, so there will be no local IP cells.

Figure 1:
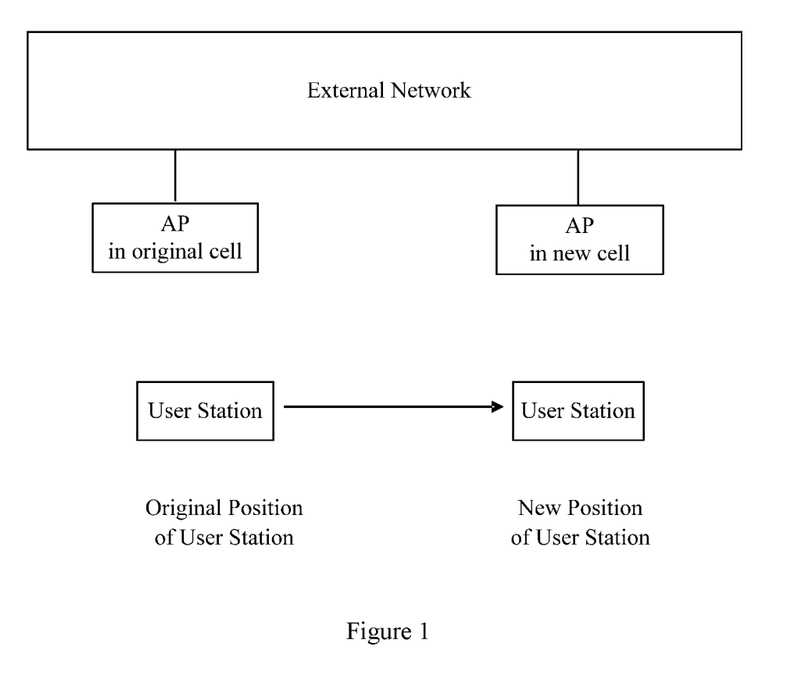
FIG. 1 is a schematic diagram of a cross-cell handover of a user station according to an embodiment of the present disclosure.

When a user station leaves a wireless network cell and enters another wireless network cell, for the sake of simplicity of explanation, in the description of the present disclosure, the original wireless network cell may be referred to as the original cell, and the corresponding AP may be referred to as the original cell AP or the original AP. The newly entered wireless network cell may be referred to as a new cell, and the corresponding AP may be referred to as the new cell AP or the new AP. An example of cross-cell handover of the user station is shown in FIG. 1.

In the technical solution provided by the present disclosure, after a user station accesses a certain wireless network cell, it may communicate with another station outside the cell via the AP, and realize data transmission between each other. The user station may also communicate with another station in the same cell via the AP to realize data transmission between each other. For the sake of convenience of description, the present disclosure may refer a station that communicates with the current user station and realizes data transmission as the correspondent station of the current user station, or as the correspondent station.

The data transmission between the user station and its correspondent station may include data transmission from the correspondent station to the user station and data transmission from the user station to its correspondent station. For convenience of description, in the present disclosure, data transmission from the correspondent station to the user station is referred to as the forward transmission, and data transmission from the user station to the correspondent station is referred to as the reverse transmission.

The IP in IP mechanism is a protocol that encapsulates one IP packet (referred as the original IP packet) in another IP packet (referred as the encapsulating IP packet) and transfers the original IP packet as the load of encapsulating IP packet. In the method provided by the present disclosure, both the AP and the user station may support the IP in IP mechanism. In the description of the present disclosure, the original IP packet and the encapsulating IP packet in the IP in IP mechanism are also referred to as the inner IP packet and the outer IP packet, respectively. The term "IP in IP packet" may refer to the encapsulating IP packet. The address of the IP in IP packet may refer to the address of the encapsulating IP packet.

In a network supporting the IP protocol, the AP of the wireless network cell may send IP data packets to a user station under its coverage. The AP may need to maintain a network layer address-MAC layer address correspondence table, that is, an IP address-MAC address correspondence table. In the IPv4 protocol, this table is also termed ARP (Address Resolution Protocol) table. The IP address-MAC address correspondence table may include a plurality of table rows. Each table row may represent address corresponding information of a user station. Specifically, the table row may contain a user station IP address and a user station MAC address two table entries. Since the IP address-MAC address correspondence table plays a role in forwarding the IP packet from the correspondent station to the user station in the AP data transmission, in the description of the present disclosure, it may be referred to as the wireless transfer table. An example of a wireless transfer table is shown in Table 1.

TABLE 1

| Wireless transfer table in the AP | |
|---|---|
| IP address of user station in the current cell | MAC address of user station in the current cell |
| . . . | . . . |
| . . . | . . . |

Figure 2:
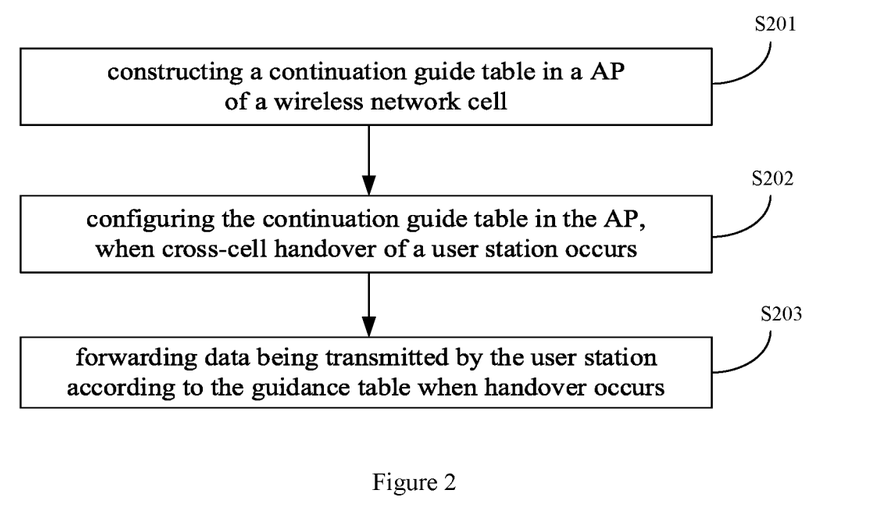
FIG. 2 is a flowchart of a method for realizing user data continued transmission during cross-cell handover according to an embodiment of the present disclosure.

Referring to FIG. 2, a method for realizing continued transmission of user data during cross-cell handover of a user station may include the following steps:

S201. constructing a continuation guide table in an AP of a wireless network cell;

S202. when cross-cell handover of a user station occurs, configuring the continuation guide table in the AP; and S203. outbound data being transmitted by the user station according to the continuation guide table.

The continuation guide table in the AP may include an outbound guide table, and may further include an inbound reference table when the cell where the AP is located contains a user station configured with a local IP address.

The outbound guide table in the AP may be used in the following scenarios. After receiving a data packet sent to the user station by its correspondent station, for the user station that was in the current cell and has since switched to another cell, the AP may search the outbound guide table to find the network layer address of the next hop station that forwards the packet. The outbound guide table may include a wireless transfer table that changes the attributes of the table entries and an outbound reference table, or it may include a wireless transfer table having an outbound-reference column.

For the wireless transfer table that changes the attributes of the table entries, the changes may be achieved by changing the entry attributes according to the current wireless transfer table in the AP as shown in Table 1. Specifically, the MAC address entry of a user station in the current cell in the wireless transfer table may be changed to the MAC address/virtual connection number entry of the user station in the cell. The thus obtained wireless transfer table in which the entry attributes has changed is shown in Table 2.

TABLE 2

Wireless transfer table for changing entry attributes in the AP

| IP address of user station in the current cell | MAC address/virtual connection number of user station in the current cell |
|---|---|
| . . . | . . . |
| . . . | . . . |

In the wireless transfer table in which the attributes of the table entries are changed, the virtual connection number is a label that the AP configures for the user station that leaves its coverage cell, and each virtual connection number corresponds to a user station that has left the cell.

The virtual connection number may be generated using a different format the MAC address. For example, a number that is not equal to the length of the MAC address may be used, or an address value that cannot be used as the MAC address defined in the MAC protocol may be used, etc. Thus, the AP may distinguish whether a number is the MAC address of the user station or the virtual connection number of the user station only by examining the format of the number entry itself.

The structure of the outbound reference table added in the AP is shown in Table 3. The table may include several table rows. Each table row may contain two entries: the virtual connection number and the global IP address of the outbound target station. The virtual connection number may be the virtual connection number defined in Table 2. The outbound target station global IP address refers to the global IP address of the next hop station to which the continued transmission of user data packets are forwarded by the AP. When the user station is configured with a global IP address in the new cell, the value of outbound target station global IP address may be the global IP address of the user station in the new cell. When the user station is configured with a local IP address in the new cell, the value of outbound target station global IP address may be the global IP address of the new cell AP.

TABLE 3

An outbound reference-transfer table in the AP

| virtual link number | global IP address of the outbound target station |
|---|---|
| . . . | . . . |
| . . . | . . . |

By constructing a new table column in the wireless transfer table in the AP, and placing the outbound target station global IP address entry in the into the column, a wireless transfer table including the outbound reference list may be obtained. The wireless transfer table including the outbound-reference column may be used as an outbound guide table. The structure of the wireless transfer table including the outbound-reference column is as shown in Table 4. The table may include a plurality of table rows. Each table row may include three entries: the IP address of the user station of the current cell, the MAC address of the user station of the current cell, and the outbound target station global IP address. Compared with the outbound reference-guide table composed of Table 2 and Table 3, Table 4 omits the contents related to the virtual connection number.

In the wireless outbound reference table with the outbound-reference column shown in Table 4, each table row corresponds to one user station. For the user station, only one of the user station MAC address and outbound target station global IP address is valid. When the user station is still in the current cell, the user station MAC address table entry of the cell is valid; when the user station has left the cell and enters a new cell, the outbound target station global IP address table entry is valid. A table entry may be made invalid by filling in invalid MAC address of the user station or invalid global IP address of the outbound target station in the corresponding table entry. Examples of invalid MAC addresses of user stations may include: the MAC address of AP itself in the current cell, an invalid address value as defined by the MAC protocol of a user stations, and so on. Examples of invalid outbound target station global IP address may include: the global IP address of the AP itself in the current cell, a local IP address defined by the IP protocol, and other non-global IP addresses defined by the IP protocol. When the AP searches for the location of the user station according to the wireless transfer table, it finds the valid entry of the two entries, and then obtains the address of the station to which the data packet is to be sent.

TABLE 4 wireless-transfer table including the outbound-reference column

| IP address of user station in the current cell | MAC address of user station in the current cell | global IP address of the outbound target station |
|---|---|---|
| . . . | . . . | . . . |
| . . . | . . . | . . . |

When there is a user station configured with a local IP address among the user stations in the wireless network cell where the AP is located, an inbound reference table is added to the AP.

The function of the inbound reference table added in the AP may include the following. For a user station that is switched to access the current cell and configured with a local IP address, when the AP receives a continued forwarding packet sent by another AP, by searching the table, the local IP address of the user station in the current cell may be found. The structure of the inbound reference table is shown in Table 5, which may include a plurality of table rows. Each table row may include three entries: the global IP address of the original AP, the user station's IP address of in the original cell, and the user station's IP address in the current cell. The IP address of the user station in the original cell may be a global IP address or a local IP address.

TABLE 5

Inbound reference table added to the AP of the current cell

| global IP address of original AP | The user station's IP address in the original cell | The user station's IP address in the current cell |
|---|---|---|
| . . . | . . . | . . . |
| . . . | . . . | . . . |

When a user station is handed over from the original cell to a new cell, the configuration of the continuation guide table in the AP may be realized through signal interaction between the user station, the new cell AP and the original cell AP. Alternatively, a dedicated server may be configured in an external network. At least one of the user station, the new cell AP, and the original cell AP may provide information related to the user station cross-cell handover by signal interaction. The dedicated server may integrate the information to guide the configuration of the continuation guide table in the AP. Thereafter, the data being transmitted by the user station with which the cross-cell handover occurs will be transferred to the location of the user station in the new cell through the configured continuation guide table, so that the data currently being transmitted may be continuously transmitted.

When a cross-cell handover of a user station from the original cell to a new cell occurs, if the user station is configured with a global IP address in the new cell, only the outbound guide table of the original cell AP needs to be configured. If the user station is configured with a local IP address in the new cell, the inbound reference table of the new cell AP needs to be configured.

When a cross-cell handover of a user station from the original cell to a new cell occurs, after the original cell AP determines that the cross-cell handover of the user station has occurred, and the original cell AP obtains the global IP address of user station in the new cell or the global IP address of the new cell AP (when the user station is configured with a local IP address in the new cell), the original cell AP may configure its outbound guide table. The details are described below.

For the AP's outbound guide table including a wireless transfer table that changes the attributes of the table entries and an outbound reference table, first, the AP may assign a virtual connection number to the user station for which the handover occurs. In the wireless transfer table row associated with the user station, the AP may fill the virtual connection number into the MAC address/virtual connection number entry of the current cell, to replace the original MAC address of the user station. Next, the AP may create a new table row in the outbound reference table, and fill in the virtual connection number of the user station and the global IP address of the outbound target station to in the two entries of the table row. If the user station is configured with a global IP address in the new cell, the global IP address of outbound target station is the global IP address of the user in the new cell. If the user station is configured with a the local IP address in the new cell, global IP address of the outbound target station is the global IP address of the new cell AP.

For the AP's outbound guide table including a wireless transfer table with an outbound-reference column, in the table row related to the user station, the AP may configure the MAC address entry of the user station of the cell to an invalid value, and fill in the corresponding value in the entry of the global IP address of the outbound target station.

When the user station crosses from the original cell to a new cell, the new cell AP may accept the handover access of the user station, assign a local IP address to the user station, and acquire the global IP address of the original cell and the user station's IP address in the original cell, then the new cell AP may configure its inbound reference table. Specifically, it may create a new table row in the inbound reference table, and fills in the corresponding value in the three entries of the table row according to the names of the entries. The original AP global IP address entry is filled in the global IP address of the original cell AP, the IP address entry of the user station in the original cell is filled in the IP address of the user station in the original cell, and the local IP address entry of the user station in the cell is filled in the local IP address of the user station in the new cell.

At this point, the configuration of the continuation guide table of the AP is completed. Thereafter, according to the continuation guide table of the AP, the data being transmitted between the correspondent station of the user station and the user station in the original cell at the time of the handover occurs continues to be transmitted after the user station switches to the new cell.

The data transmission between the user station and its correspondent station realized by the continuation guide table in an AP may include data transmission of the forward link from the correspondent station to the user station and data transmission of the reverse link from the user station to its correspondent station. Regardless of whether it is the data transmission of the forward link or the data transmission of the reverse link, the AP can find the address of the next hop station of the current data transmission according to its continuation guide table.

In the method provided by the present disclosure, when the original cell AP sends a data packet to its next hop station according to the outbound reference table and the new cell AP sends a data packet to its next hop station according to the inbound reference table, or when the user station sends a data packet to its next hop station, in addition to the data packet transmission between the original cell AP and the correspondent station of the user station, each station encapsulates the data packet using IP in IP protocol, and then sends the data packet to the next hop station. The source address of the external IP packet of the IP in IP packet is the IP address of the sending station itself, the destination address of the external IP packet is the IP address of the next hop station, and the internal IP packet encapsulated in the IP in IP packet (the original IP packet) is: the data packet sent between the original cell AP and the user station assuming that the user station is still in the original cell.

When the original cell AP, the new cell AP, or the user station receives the data packet sent to itself encapsulated in IP in IP protocol, it may assume that the data packet may be a continuation transmitted data packet, and try to follow the process that should be followed for continued transmission. Specifically, if the AP finds that the received data packet matches a table row in the continuation guide table, the AP may perform further processing according to the matched table row. Otherwise, the data packet may be discarded. If the user station finds that the received data packet matches the data flow of its own continued transmission, it may accept it as a data packet sent to itself. Otherwise, the user station may discard the data packet.

After the user station is switched across cells and then enters a new cell, for the data packet transmitted between the user station and its correspondent station, the original cell AP may find the address of the next hop station of the data packet according to its own outbound guide table. The process in which the original cell AP finds its next hop station address for the forward-transmitted data packet and the reverse-transferred data packet is described by the flows S1 and S2, respectively.

Flow S1: The original cell AP receives the IP data packet sent by the correspondent station of the user station, and according to the IP destination address of the data packet, determines that this is a data packet sent to the user station. The original cell AP processes the packet in the same manner as if the user station is still in the original cell, and send the user station's IP address in the cell to the wireless transfer table. Based on the IP address of the user station in the cell, the original cell AP obtains the virtual connection number of the user station from the wireless transfer table that changes the attributes of the table entry, and then finds the global IP address of the destination station in the outbound reference table based the virtual connection number. Alternatively, according to the IP address of the user station in the cell, the original cell AP obtains the global IP address of the destination station of the user station in the wireless transfer table including the outbound reference column, the address being the address of the next hop station to which original cell AP forwards current data packet.

Flow S2: The original cell AP receives the IP in IP packet sent to it by a global IP address. It assumes that it may be a continuing transmitted packet, and attempts to process the packet in the way of processing a continuing transmitted packet. It performs de-encapsulation on IP in IP packet and obtains the source address of the internal IP packet and the source address of the external IP packet. For the binary group consisting of the user station IP address entry of the local cell and the global IP address of the destination station entry corresponding to each local cell user station in the outbound guide table, the original cell AP compares the values of the two obtained address and the values of each of the above-mentioned binary groups, wherein the source address of the obtained internal IP packet is compared with user station's IP address entry of the cell in the outbound guide table, and the source address of the obtained external IP packet is compared with the global IP address of the destination station entry in the outbound guide table. If the above-mentioned binary group that exactly matches the value in the outbound guide table is compared, the currently obtained internal IP packet is the data packet sent to the external network station by the user station originally in the cell, the destination IP address of the internal IP packet is the address of the next hop station.

After the user station is switched across cells and then enters a new cell, if the user station is configured with the local IP address in the new cell, according to its own inbound reference table, the new cell AP can find the address of the next hop station of the data packet transmitted between the user station and its correspondent station. The process in which the new cell AP finds its next hop station address for the forward transmitted data packet and the reverse transmitted data packet is described by flows S3 and S4, respectively.

Flow S3: The new cell AP receives an IP in IP packet sent to it by a global IP address. Assuming that it may be a packet that is continuously transmitted, it attempts to process the packet in the way of processing the continuously transmitted packet. It performs de-capsulation on IP in IP packet and obtains the source address of the external IP packet and the target address of the internal IP packet; the new cell AP compares the two IP addresses obtained according to the row of the inbound reference table, respectively with each table row original AP global IP address table entry and user station IP address table entries in the original cell. If the two entries match at the same time, address of the user station in the corresponding table row is in the local IP of the cell is the address of the next hop station that transmits the current packet.

Flow S4: The new cell AP receives an IP in IP packet sent to it by a local IP address. Assuming that it may be a packet that is continuously transmitted, it attempts to process the packet in the way of processing the continuously transmitted packet. It performs de-capsulation of IP in IP packet and obtains the source address of the internal IP packet and the source address of the external IP packet; the new cell AP compares the two IP addresses obtained according to the row of the inbound reference table, respectively with each table row User station in the original cell IP address entry and the local IP address entry of the user station in the local station. If the two entries match at the same time, the station original global IP address in the corresponding table row is the address of the next hop station to which the current packet is transmitted.

After the user station is switched across cells and then enters a new cell, for the data packet transmitted between the user station and its correspondent station, according to the received information, the user station may obtain the address of the next hop station of the packet that sent to its correspondent station through the reverse link. The specific process is described by the process S5.

Process S5: The user station receives an IP in IP packet sent to it. Assuming that it may be a packet that is continuously transmitted, it attempts to process the packet in the way of processing the continuously transmitted packet. It performs de-capsulation of IP in IP packet and obtains internal IP packet and the source address of the external IP packet; the user station compares the obtained internal IP packet according to its IP address, TCP/UDP port number and other information with the corresponding information of data flow which is receiving when the user station is in the original cell. If the comparison proves that it is the IP packet sent by its correspondent station to its own station in the original cell, the user station takes the source address of the obtained external IP packet as the address of its next hop station when the packet is sent on the reverse link.

In the case when the dedicated server configures the continuation guide table of the AP, the dedicated server may also configure the address of next hop station to which the data packet sent by the user station on the reverse link, so that the user station can send the packet of the reverse link before receiving the packet of the forward link.

According to the method for obtaining the next hop station address by each user station as described above and the method for sending a data packet based on the IP in IP packet after each station obtains the address of the next hop station, continued transmission of user data between the user station and its correspondent station is realized when cross-cell handover of a user station occurs. A description of the integrity of this continuation transfer implementation flow is given below. This includes the flow of continued transmission on the forward link and the flow of continued transmission on the reverse link.

When the data packets sent from the correspondent station of the user station to the user station are transmitted on the forward link, the process of the transmitted data packets are processed by each station on the link is as follows.

The AP in original cell: the AP in original cell receives the data packet from the correspondent station of the user station, and processes the data packet in the same manner as when the user station is still in the local cell, and obtains an IP data packet to be sent to the user station; the original cell AP obtains the address of the next hop station of the data packet according to the process S1; the original cell AP constructs an IP in IP packet for the internal IP packet with the data packet prepared to be sent to the user station, and then sends the IP in IP packet to the next hop station.

AP in new cell: In the case that the user station is configured with a global IP address in the new cell, the AP in new cell will not receive the IP in IP packet sent to it; in the case that the user station is configured with an local IP address in the new cell, the following is performed: The new cell AP receives the IP in IP packet from the previous hop station, obtains its internal IP packet, and obtains the address of its next hop station according to the process S3; the new cell AP constructs the IP in IP packet sent to the next hop station by using the internal IP packet obtained above as the internal IP packet, and then sends the packet to the next hop station.

User station: The user station receives the IP in IP packet sent by the previous hop and extracts the IP packet therein; after that, it treats the data packet as the data packet received when the user station is still in the original cell and processes the IP packet.

When a packet sent from a user station to its correspondent station is transmitted on the reverse link, the process of processing the transmitted packet by each station on the link is as follows.

User station: The user station constructs the data packet sent to its correspondent station as if it were in the original cell; it uses the packet as an inner IP packet to build an IP in IP packet. It takes the next hop station address obtained in process S5 or the next hop station address configured by the dedicated server as the destination address of the IP in IP packet, and send the IP in IP packet to the next hop station.

The AP in new cell: In the case that the user station is configured with a global IP address in the new cell, the new cell AP will not receive the IP in IP packet sent to it; in the case that the user station is configured with an local IP address in the new cell, the following is performed: The new cell AP receives the IP in IP packet from the previous hop station, obtains its internal IP packet, and obtains the address of its next hop station according to the process S4; it constructs the IP in IP packet sent to the next hop station by using the inner IP packet obtained above as the inner IP packet, and send the packet to the next hop station.

The AP in original cell: the original cell AP receives the IP in IP packet from the previous hop station, obtains the internal IP packet, and according to the process S2 obtains the next hop station which is the correspondent station of the user station; it regards the internal IP packet as the IP data packet sent to it by the user station when it is in the original cell, and processes as the user station is still in the original cell, and then send the data packet to the correspondent station of the user station.

In the technical solution provided by the present disclosure, the AP and the user station include at least a network layer part and a layer below the network layer, wherein the network layer part implements related to functions of network layer and supports IP protocol, the layer below the network layer part implements the functions of the physical layer and the MAC layer of the station.

The technical solution provided by the present disclosure realizes the continued transmission of the user data flow being transmitted by constructing a continuation guide table in an AP, and the continuation guide table is located in the network layer part of the AP. The continuation guide table of the AP includes at least an outbound guide table. When the cell where the AP is located includes a user station configured with a local IP address, the continuation guide table of the AP further includes a inbound reference table. The AP's outbound guide table is composed of a wireless transfer table of changing the attributes of the table entry and an outbound reference table, or a wireless transfer table including an outbound reference list, wherein the above two types of wireless transfer table are respectively implemented by changing the attributes of the table entry and adding a table column. The above-mentioned wireless transfer table can implement a normal wireless transfer function for a user station that is in the cell without a handover.

Figure 3:
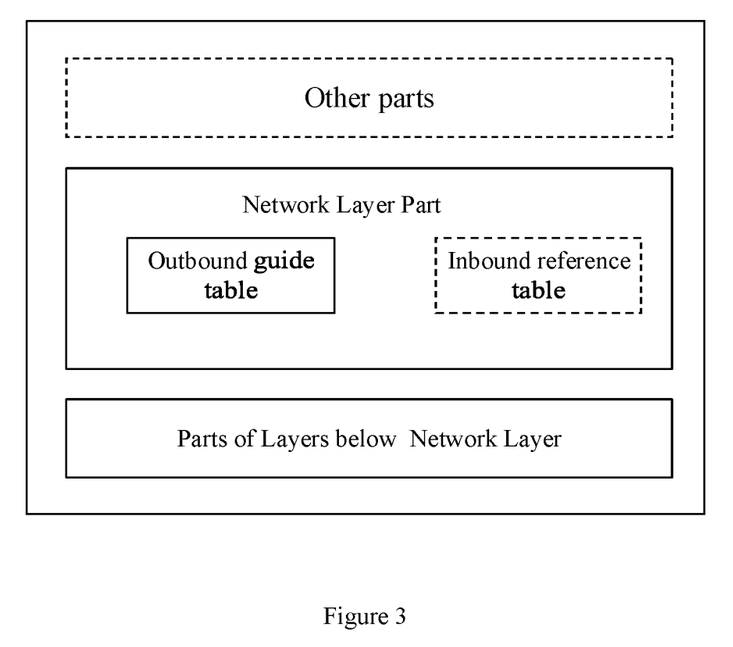
FIG. 3 is a schematic structural diagram of an access point AP device according to an embodiment of the present disclosure.

The structure of the access point AP device is as shown in FIG. 3, wherein a dotted frame indicates that this part may not exist.

The disclosure also discloses an AP of a wireless network cell, which is internally provided with a continuation guide table. The continuation guide table includes at least an outbound guide table for searching for a network layer address of the next hop station that is forwarded: after receiving the data packet sent by the correspondent station of the user station of the cell to the user station, through the search of the table, for the user station that is in the current cell but has switched to other cells, the AP can find the network layer address of the next hop station that forwards the data packet; when the cell where the AP is located contains a user station configured with a local IP address, continuation guide table comprises: a inbound reference table, used to find the local IP address of the user station in the local cell: for the user station that is switched to access the local cell and configured with the local IP address, when the AP receives the continued forwarding packet sent by other APs, searching the inbound reference table and finding out the local IP address of the user station in the cell.

The AP's outbound guide table includes a wireless transfer table of changing the attributes of the table entry or a wireless transfer table including an outbound reference list. The AP configures a virtual connection number for the user station that leaves the original cell and enters a new cell. In the wireless transfer table including an outbound reference list, the AP configures a global IP address of the destination station for the user station that leaves the home cell and enters the new cell. The user station that is in the cell without a handover can implement a normal wireless transfer function.

The disclosure also discloses a terminal for a wireless network (the user station of the wireless network), comprising: IP address resolution module, configured to: after confirming that the original IP packet (that is, the original IP package) encapsulated in the received IP in IP packet is a continued forwarding packet sent to itself, taking the source address of the above IP in IP packet as the address of the next hop station of the reverse transmission packet of the terminal.

In summary, the present disclosure provides a technical solution for constructing a continuation guide table in a wireless network cell access point AP; when a user station cross-cell handover occurs, configuring the continuation guide table in the AP; and when handover occurs, outbound data being transmitted by the user station according to the guide table. In this way, when a user station cross-cell handover occurs, continued transmission of user data being transmitted is realized. By adopting the technical solution provided by the present disclosure, using the method in a current wireless network cell can significantly improve the user experience when using the wireless network to access the Internet in the mobile state.

The present disclosure can be implemented or used by those skilled in the art in light of the disclosed embodiments. Various modifications to these embodiments are obvious to those skilled in the art, and the general principles defined herein may be applied to other embodiments without departing from the scope and spirit of the disclosure. The above-mentioned embodiments are merely preferred embodiments of the present disclosure, and are not intended to limit the present disclosure. Any modifications, equivalents, improvements, etc., which are included in the spirit and principles of the present disclosure, should be included in the scope of protection of the present disclosure.

What is claimed is:

1. A method for realizing continued transmission of user data during a cross-cell handover of a user station, comprising:
   constructing a continuation guide table in a first access point in a first wireless network cell, the continuation guide table including an outbound guide table, and the outbound guide table including a wireless transfer table;
   configuring the continuation guide table in the first access point when the cross-cell handover of the user station occurs; and
   forwarding data transmitted by the user station according to the continuation guide table;
   wherein:
      the wireless transfer table includes a first data field of a user station IP address, a second data field of a user station MAC address, and a third data field of a global IP address of a next hop station;
      in response to the user station being in the first wireless network cell, the third data field is filled with a first invalid data entry, the first invalid data entry including one of a global IP address of the first access point or a non-global IP address defined by an IP protocol;
      in response to the user station having left the first wireless network cell, the second data field is filled with a second invalid data entry, the second invalid data entry including one of an MAC address of the first access point or an invalid address value defined by an MAC protocol; and
      the method further comprises determining whether the user station has left the first wireless network cell according to data validity of the first data field or the second data field.

2. The method according to claim 1, further comprising:
   in response to the user station receiving a data packet sent by a correspondent station of the user station and the user station having moved from the first wireless network cell to a second wireless network cell, searching through the outbound guide table to find a network layer address of the next hop station for forwarding the data packet.

3. The method according to claim 2, wherein:
   the continuation guide table further includes an inbound reference table;
   the method further comprises: in response to the first access point receiving a forwarded data packet and the user station having moved from the second wireless network cell to the first wireless network cell and having been configured with a local IP address in the first wireless network cell, searching the inbound reference table to find the local IP address of the user station in the first wireless network cell.

4. The method according to claim 3, wherein:
   the inbound reference table includes a sixth data field of original access point global IP address, a seventh data field of user station IP address in the second wireless network cell, and an eighth data field of user station local IP address in the first wireless cell.

5. The method according to claim 2, wherein configuring the continuation guide table in the first access point comprises:
   uploading configuration information to a dedicated server in an external network by at least one of: the user station, the first access point, and a second access point in the second wireless network; and
   configuring the continuation guide table in the first access point by the dedicated server.

6. The method according to claim 2, wherein configuring the continuation guide table in the first access point comprises:
   exchanging information through signaling between two of: the user station, the first access point in the first wireless network cell, and a second access point in the second wireless network cell.

7. The method according to claim 2, further comprising:
   in response to the user station sending a data packet to the correspondent station of the user station and the user station having moved from the first wireless network cell to the second wireless network cell, searching the outbound guide table to find a network layer address of the next hop station for forwarding the data packet.

8. The method according to claim 2, wherein forwarding data transmitted by the user station according to the guide table comprises:
   encapsulating the data packet using an IP in IP protocol, wherein the data packet is encapsulated in an external IP packet, a source address of the external IP packet being an IP address of a sending station, and a destination address of the external IP packet being an IP address of the next hop station; and
   sending the encapsulated data packet to the next hop station.

9. The method according to claim 8, further comprising:
   in response to the user station receiving an IP in IP packet, determining that the IP in IP packet is a data packet having been forwarded by a previous hop station and recording a source address of the IP in IP packet as the network layer address of the next hop station for a reversed packet transmission.

10. An access point device in a first wireless network cell, configured to:
    construct and store a continuation guide table in the access point device, the continuation guide table including an outbound guide table, and the outbound guide table including a wireless transfer table;
    configure the continuation guide table when a cross-cell handover of a user station occurs; and
    forward data transmitted by the user station according to the continuation guide table;
    wherein:
       the wireless transfer table includes a first data field of user station IP address, a second data field of user station MAC address, and a third data field of a global IP address of a next hop station;
       in response to the user station being in the first wireless network cell, the third data field is filled with a first invalid data entry, the first invalid data entry including one of a global IP address of the access point or a non-global IP address defined by an IP protocol;
       in response to the user station having left the first wireless network cell, the second data field is filled with a second invalid data entry, the second invalid data entry including one of an MAC address of the access point or an invalid address value defined by an MAC protocol; and
       the access point device is further configured to determine whether the user station has left the first wireless network cell according to data validity of the first data field or the second data field.

11. The access point device according to claim 10, wherein the access point device is further configured to: in response to the user station receiving a data packet sent by a correspondent station of the user station and the user station having moved from the first wireless network cell to a second wireless network cell, search the outbound guide table to find a network layer address of the next hop station for forwarding the data packet.

12. The access point device according to claim 11, wherein:

the continuation guide table further includes an inbound reference table; and the access point device is further configured to: in response to the first access point receiving a forwarded data packet and the user station having moved from the second wireless network cell to the first wireless network cell and having been configured with a local IP address in the first wireless network cell, search the inbound reference table to find the local IP address of the user station in the first wireless network cell.

13. The access point device according to claim 12, wherein:

the inbound reference table includes a sixth data field of original access point global IP address, a seventh data field of user station IP address in the second wireless network cell, and an eighth data field of user station local IP address in the first wireless cell.

14. The access point device according to 11, wherein the access point device is further configured to:

in response to the user station sending a data packet to the correspondent station of the user station and the user station having moved from the first wireless network cell to a second wireless network cell, search the outbound guide table to find a network layer address of the next hop station for forwarding the data packet.

15. The access point device according to 11, wherein the access point is further figured to:

in response to the user station receiving an IP in IP packet forwarded by a previous hop station, determine that the IP in IP packet is a data packet having been forwarded by a previous hop station and record a source address of the IP in IP packet as the network layer address of the next hop station for a reversed packet transmission.

* * * * *